US007006467B2

(12) United States Patent
Anton, Jr. et al.

(10) Patent No.: US 7,006,467 B2
(45) Date of Patent: Feb. 28, 2006

(54) METHOD AND SYSTEM FOR SIMULATING MULTIPLE INDEPENDENT CLIENT DEVICES IN A WIRED OR WIRELESS NETWORK

(75) Inventors: Francis M. Anton, Jr., San Jose, CA (US); Ranganatha Marathe, Santa Clara, CA (US)

(73) Assignee: HereUare Communications, Inc., San Jose, CA (US)

( * ) Notice: Subject to any disclaimer, the term of this patent is extended or adjusted under 35 U.S.C. 154(b) by 852 days.

(21) Appl. No.: 10/135,933

(22) Filed: Apr. 29, 2002

(65) Prior Publication Data

US 2003/0202486 A1    Oct. 30, 2003

(51) Int. Cl.
*H04Q 7/00* (2006.01)
(52) U.S. Cl. .................................. 370/329; 370/315
(58) Field of Classification Search .................. None
See application file for complete search history.

(56) References Cited

U.S. PATENT DOCUMENTS

| | | | |
|---|---|---|---|
| 6,779,185 B1 * | 8/2004 | Roukbi et al. | 719/321 |
| 2002/0046287 A1 * | 4/2002 | La Porta et al. | 709/230 |
| 2003/0027577 A1 * | 2/2003 | Brown et al. | 455/445 |
| 2004/0103278 A1 * | 5/2004 | Abhishek et al. | 713/160 |
| 2005/0176473 A1 * | 8/2005 | Melpignano | 455/574 |

* cited by examiner

*Primary Examiner*—Duc Ho
*Assistant Examiner*—Thien D. Tran
(74) *Attorney, Agent, or Firm*—Intellectual Property Law Group LLP; Otto O. Lee; Juneko Jackson (57) ABSTRACT

Disclosed is a system which provides virtual Ethernet and virtual Wireless Ethernet (e.g. 802.11b) interfaces for client using a single host device. Providing virtual Ethernet interfaces for a client requires one physical Ethernet card/interface. Providing virtual Wireless Ethernet interfaces for a client requires two physical wireless Ethernet cards/interfaces. Applications can use these virtual interfaces as if they are real interfaces using socket interfaces.

38 Claims, 7 Drawing Sheets

| DA | SA | Type/len | Data | FCS |

PRIOR ART

FIG. 5

| FC | DID | AD1 | AD2 | AD3 | Seq | AD4 | Frame Body | FCS |

PRIOR ART

METHOD AND SYSTEM FOR SIMULATING MULTIPLE INDEPENDENT CLIENT DEVICES IN A WIRED OR WIRELESS NETWORK

BACKGROUND

1. Field of the Invention

The present invention is directed to a computer method and system for performing data and signal communication between devices. More particularly, the invention is directed to such communications which utilize Wireless and wireline networking.

2. Related Art

The popularity of the Internet has made a vast amount of information readily available to anyone with an Internet connection. Internet-enabled electronic mail has become an essential form of business communication. Currently, connections to the Internet are predominantly made with landline access links such as dial-up modems, digital subscriber lines, and cable modems.

These types of connections, although pervasive, offer limited mobility to a user and make the sharing of an Internet connection difficult. For example, many libraries offer Internet access at dedicated computer terminals and some universities provide network access jacks at multiple buildings on their campuses for convenient access by students using laptop computers. Both of these approaches offer a means for accessing the Internet at locations other than one's own landline access link, but both require that one remain stationary at the publicly-provided access point and both require a substantial infrastructure investment on the part of the institution providing the network connection. Since it is not generally possible to have multiple users sharing the same network access jack or dedicated terminal, the institution must provide a separate access point for each patron it wishes to service. Additionally, those institutions offering access jacks to their network, such as universities, typically require that the user have a registered network account before being given access to the network, which further limits the network's accessibility to the public.

Similarly, when a customer visits a service provider site on whose computer network the customer does not have an account, the customer will find it very difficult to gain access to the network, and hence to the Internet, email accounts, and other vital data. Should the customer be fortunate enough to gain access to a network jack, the customer will still be at the mercy of the service provider site network administrator. For security reasons, it is customary for service provider companies to set up their computer networks to deny access to anyone not already present in their access list of registered users.

Thus, mobile access to the Internet is limited by two factors. The first is the physical requirement for a user to maintain a line connection to sparsely located network access jacks. The second is the difficulty in gaining access to a network on which one does not have a registered account. The first of these factors has begun to be overcome by the introduction of wireless data networks, which do not require that a user maintain an access line plugged into a network access jack and thus do not require that the user remain stationary. Additionally, because the network connections are made wirelessly, it is relatively easy for multiple users to connect and disconnect from a network using the same access point. Overcoming the second factor is not so straightforward, and is addressed more fully below.

An example of a currently widely available wireless data network is the low speed personal communication service (PCS) network. The primary access devices of this type of network are cellular telephones with built-in Wireless Application Protocol (WAP) features. These wireless networks operate in a licensed frequency band, are centrally planned, and are built by large telecommunication carriers. Typically, each cell has a large radius of about 2–10 miles and operates at a slow speed of about 19 Kbps. In any given geographical region there are only a handful of telecommunication carriers servicing the area, and each network is proprietary and closed to competing networks. Thus, to some degree one is not free to roam from one network to another. Additionally, their slow speed makes full access to the Internet impractical and such network devices are typically restricted to abridged textual displays.

An emerging new class of wireless data networks offer higher speeds of about 1–11 Mbps. These networks operate in an unlicensed frequency band and are based on emerging wireless communication protocol standards such as IEEE 802.11, Bluetooth and homeRF. A common characteristic of these types of networks is a small cell radius of about 200 feet. The cells are radio or infrared base stations that function as access points to a network. Several of these access points may be distributed in close proximity to each other to expand the overall range of this type of wireless network. An introduction to such networks is disclosed in U.S. Pat. Nos. 5,771,462 and 5,539,824.

Figure 1:
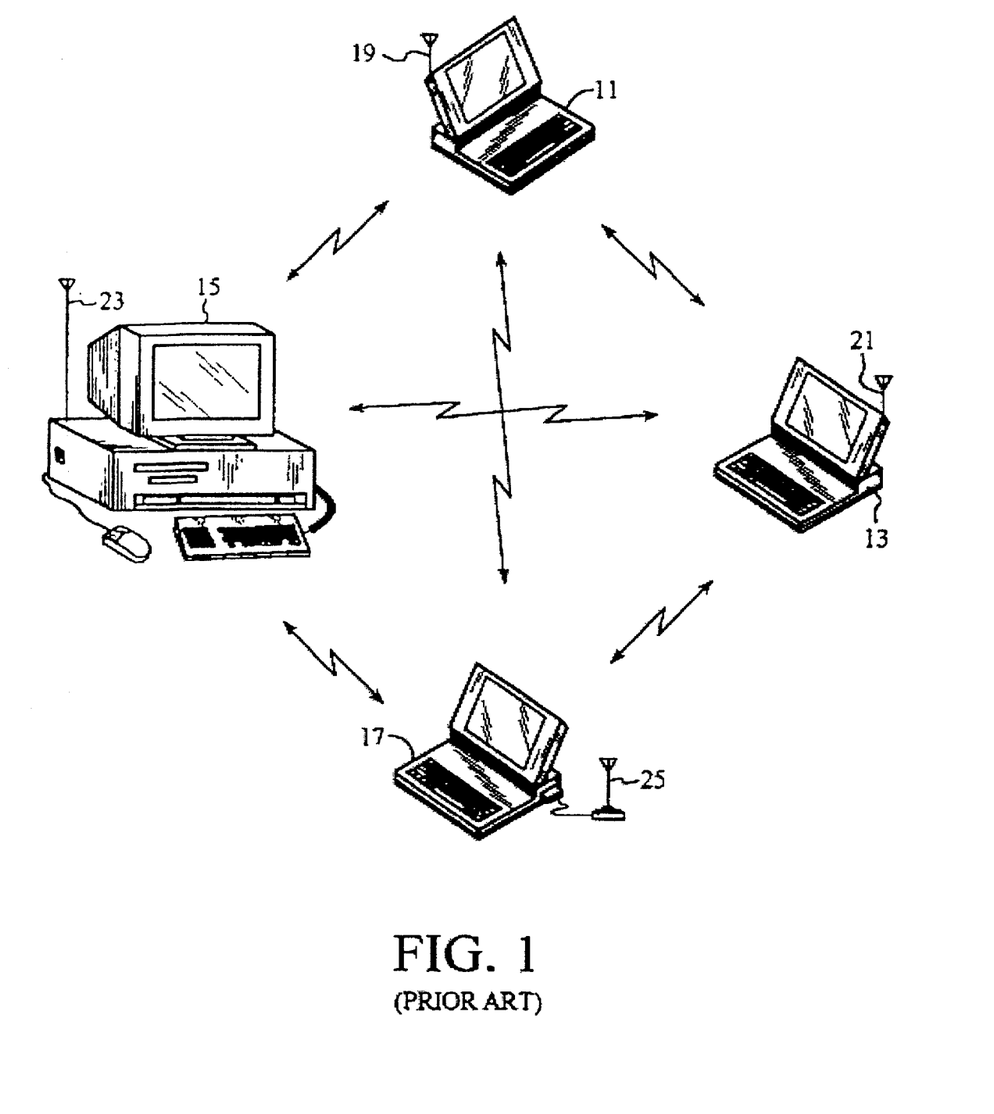
FIG. 1 shows a prior art wireless and wireline computer network.

Various network configurations may be formed using these types of wireless network devices. FIG. 1 shows multiple computers 11 to 17 equipped with wireless network radio devices characterized by respective antennas 19–25. When computers 11–17 are within close proximity to each other, they can form a type of ad hoc network and communicate among themselves. Absent from this type of ad hoc network, however, is a base station cell that can connect their ad hoc network to a wireline network having landline access to the Internet. Therefore, this type of ad hoc network does not have access to the Internet.

Figure 2:
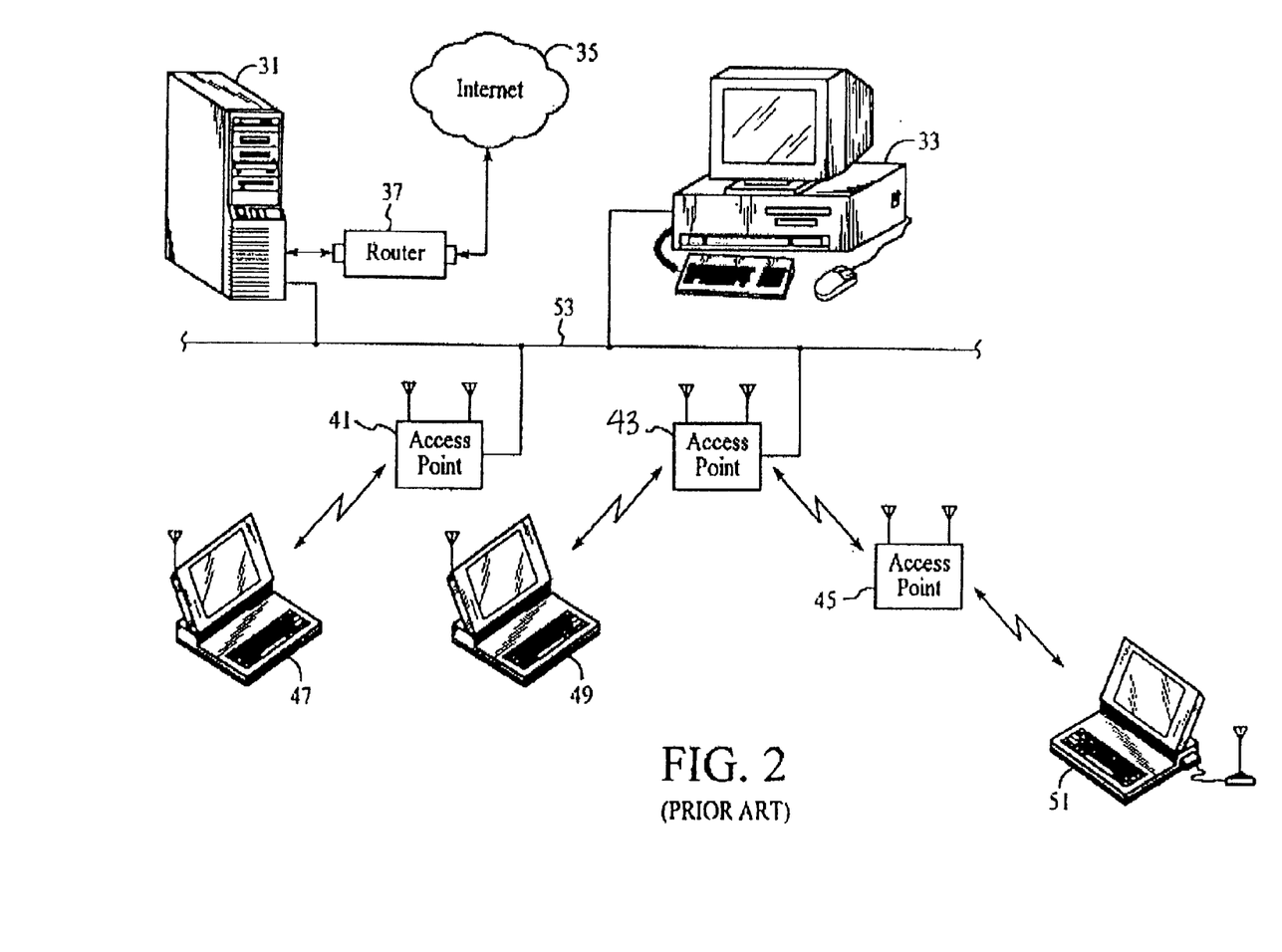
FIG. 2 shows a prior art distributed wireless and wireline computer network having access to the Internet.

With reference to FIG. 2, in order to access the Internet, one needs to gain access to a network having a router 37 which in turn connects the network to the Internet 35. These types of networks are typically characterized by a server 31 which controls access to various services on the network, including Internet services. Workstations 33 connect to the server 31 by means of various types of hardware cabling media 53. The network may provide wireless access points 41 and 43 to respectively couple computers 47 and 49, which are equipped with wireless communication devices illustrated as antennas, to the hardwired network controlled by server 31.

The access points 41 and 43 establish wireless connections with computers 47 and 49 by means of various communication systems such as radio and infrared waves, and have a hardwired connection to server 31 along cable 53. The function of access points 41 and 43 is to relay communication between server 31 and wireless network computers 47 and 49 respectively, but server 31 still controls what services are provided to computers 47 and 49. Thus, server 31 may deny Internet services to computers 47 and 49. Indeed, server 31 may refuse computers 47 and 49 entry to the network if they do not already have network accounts registered with server 31.

As was stated above, wireless networks have a short range, and so a second access point 45 may be used to function as a repeater between a more distant wireless network computer 51 and access point 43. This is an example of using multiple base station access points 43 and 45 to extend the range of a wireless network.

Figure 3:
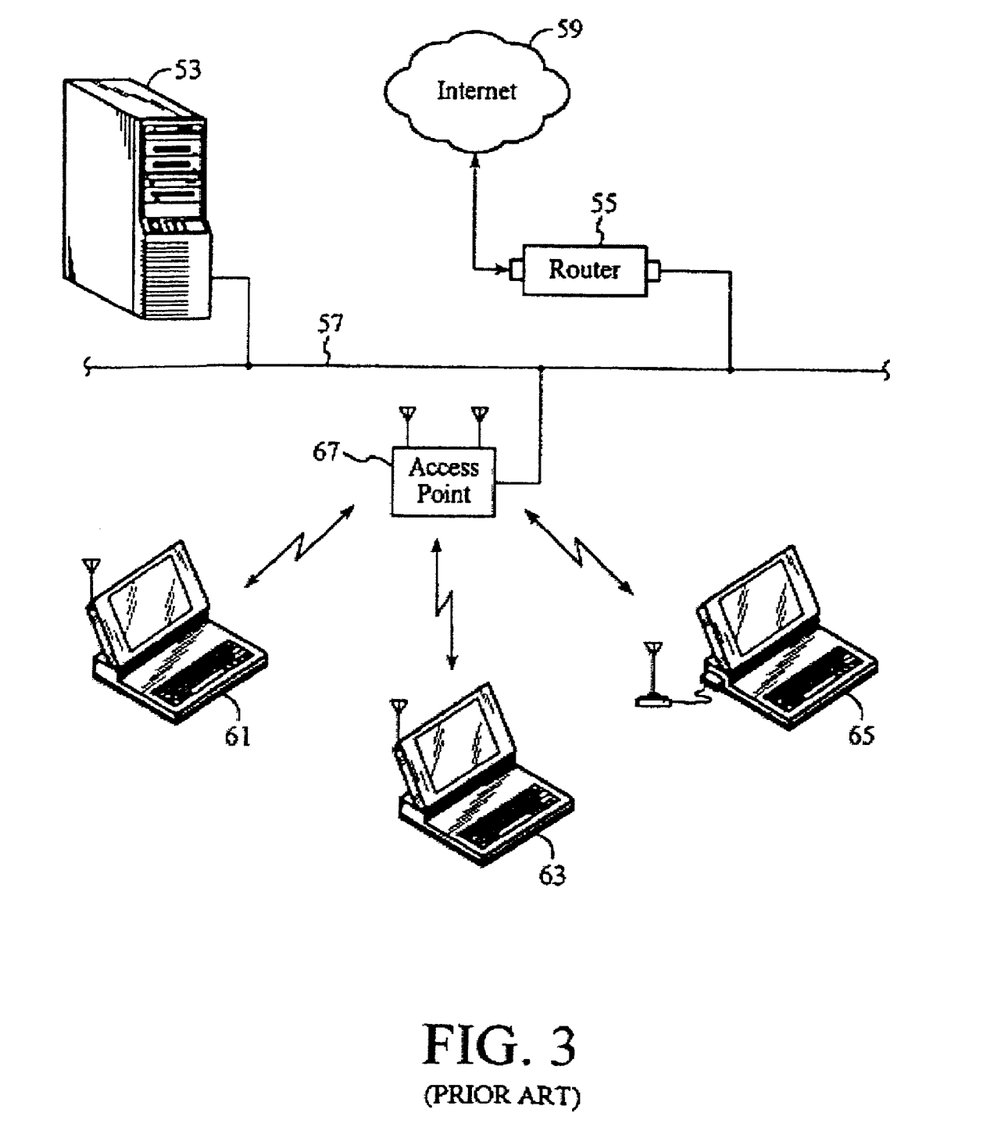
FIG. 3 shows a prior art shared computer network having access to the Internet.

With reference to FIG. 3, many network layout configurations are known, and server 54 need not be located between a router 55 and the other network nodes 61 to 65. In the network layout of FIG. 3, access point 67 has direct access to router 55, which in turn has access to the Internet 59, but this does not mean that server 54 loses its control over the network. Regardless of the layout, server 54 may still be in charge of authenticating new users and assigning resources. Again, access point 67 is illustrated as a wireless access point due to its convenience in permitting multiple users 61 to 65 easy access to the network, but other hardwired access point connections are likewise typical.

In spite of their convenience, such wireless networks have been prohibitive in the past due to their relatively high costs. Until recently, the components required to implement a wireless network had been costly, but recent developments in technology have begun lowering the price of both the cell base stations and radio devices needed to implement a wireless network. Such wireless networks are now becoming more prevalent in the industry, and there may be a time when many small businesses may operate their own autonomous wireless networks. The size of these autonomous wireless networks could range from a city block, to a small building, to a coffee shop. It would then be possible for a mobile user to always have access to a wireless network by means of a mobile computing device equipped with the proper radio communication devices. Thus, this type of wireless network would overcome the first factor limiting the free and mobile access to the Internet discussed above.

Nonetheless, one is still faced with the second factor mentioned above which restricts mobile access to the Internet. Since most autonomous wireless networks are independent, a mobile user would typically not be given access to a target network unless an access account had been set up ahead of time for the mobile user on the target network. Even if a user had access accounts at multiple wireless networks, the user would have to stop his activities and re-authenticate on a different wireless network every time he moved from one autonomous network to another.

Particularly, when multiple mobile users access a wireless network, there has been no way to test the environment and response by the access point serving those users without an actual deployment. Testing these wireless networks by actually deploying mobile user stations (such as laptops) and APs (access points) and then running tests is cumbersome, time consuming and most importantly, cannot be performed without first building a working version of the system.

Figure 4:
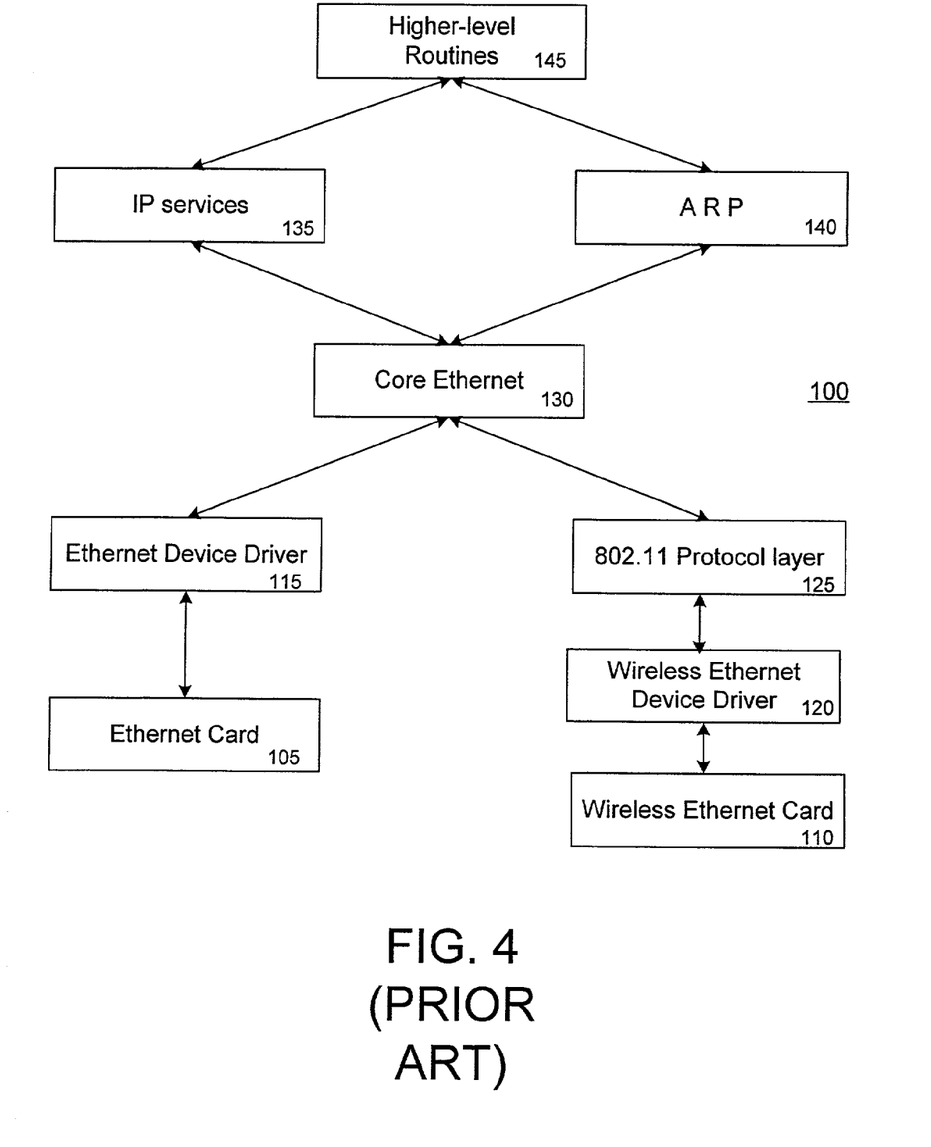
FIG. 4 shows the basic components of a device having both wireline and wireless Ethernet capability.

FIG. 4 shows the basic architecture 100 of a system the like of which may be deployed in a wireless network. In architecture 100, Ethernet communications are handled by an Ethernet card 105 and wireless Ethernet communications are handled by a wireless Ethernet card 110. These are driven by respective drivers 115 and 120. The Ethernet device driver communicates directly with the core Ethernet circuitry 130, while the wireless Ethernet device driver 120 communicates with the core Ethernet circuitry 130 via an 802.11 Protocol layer 125.

The core Ethernet circuitry 130 is the interface which fetches the packet from Ethernet or wireless Ethernet device driver and queue it for the use of the upper level protocols. The core Ethernet circuitry 130 in turn communicates with both IP services 135 which perform routing, IP packet building, and interfacing to higher-level routines 145 and an Address Resolution Protocol (ARP) routine 140 to perform conversions between IP addresses and physical machine addresses within the computer network. The IP services 135 and ARP routine 140 in turn communicate with the higher-level TCP/UDP (Transport Control Protocol/User Datagram Protocol) and application interfaces 145 to provide high-level functionality to communication routines and end-user applications.

Figure 5:
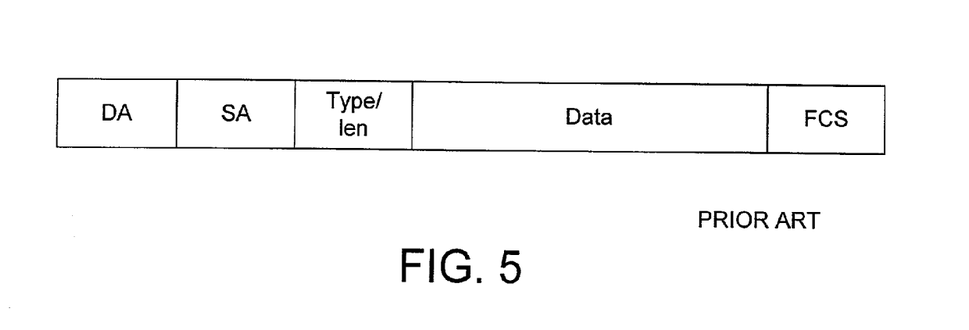
FIG. 5 shows an Ethernet frame format.

Using the implementation of this example architecture allows the core Ethernet functions 130 to interface with all Ethernet device drivers 115 and 120. The wireless driver 120 also uses the same core Ethernet functions to interface with the upper interface layers 135–145. These features of system 100 are typical of a physical wireless Ethernet and wireline Ethernet capable client such as a laptop. These systems transmit and receive Ethernet packets and Wireless Ethernet packets that have different data frame formats The Ethernet Frame format is shown in FIG. 5. Here, DA is the destination MAC (6 bytes); SA is the source MAC (6 bytes); Type is the protocol type (2 bytes); Len is the data field length (2 bytes); Data is the frame data; and FCS is the frame checksum (4 bytes).

Figure 6:
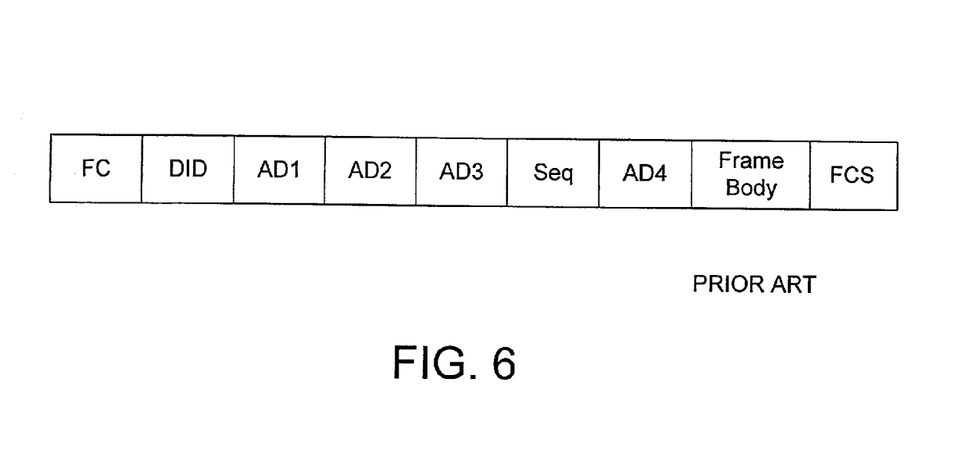
FIG. 6 shows an 802.11 frame format.

The 802.11 Data Frame format is shown in FIG. 6. FC is the frame control (2 bytes); DID is the duration ID (2 bytes); AD1 is the Address 1 (6 bytes); AD2 is the Address 2 (6 bytes); AD3 is the Address 3 (6 bytes); Seq is a sequence controller (2 bytes); AD4 is the Address 4 (6 bytes); Frame Body is from zero to 2312 bytes; and FCS is the frame check (4 bytes).

In order to test the connectivity of such systems in a wireless network, such systems must be physically duplicated many times over. Thus, there is a need for a single system which can simulate the environment of multiple clients within a wireless network without actually deploying such a network.

SUMMARY

The invention consists of a simulation system which creates and manages virtual Ethernet and virtual Wireless Ethernet interfaces, using a single host device. To simulate virtual Ethernet clients, the simulator requires only one Ethernet card. Simulation of wireless Ethernet clients functions using two wireless Ethernet cards. Applications can use these virtual Ethernet and virtual wireless Ethernet virtual interfaces as if they are real, physical interfaces using sockets. These interfaces can be used to simulate clients in a wireless LAN that connect to an "Access Point", and hence can be used in applications that perform pre-deployment testing of such LANs.

BRIEF DESCRIPTION OF THE DRAWINGS

The invention will be more easily understood in view of the following detailed description and the appended drawings, in which.

DETAILED DESCRIPTION OF THE INVENTION

In brief, the invention, in various embodiments, consists of a simulation system which simulates virtual Ethernet and virtual wireless Ethernet (e.g. 802.11b) clients (interfaces), using a single host machine. To simulate virtual Ethernet interfaces, the simulation system requires only one Ethernet card. Simulation of wireless Ethernet interfaces requires two Wireless Ethernet cards. By virtue of the simulation system, applications can use these Ethernet and wireless Ethernet virtual interfaces as if they are real interfaces using sockets.

The following are properties of the simulation system and systems/applications which utilize or implement the simulator:

(1) the number of clients (interfaces) is dependent on the host machine configuration (memory and available resources); and (2) simulating Wireless interfaces would be most ideal with minimum of two physical wireless interfaces on the host machine.

The major functionalities of the simulation system are 1) the ability to add and delete virtual interfaces; 2) to configure MAC and IP addresses for each virtual interface; 3) to send/receive packets from/to virtual interfaces using sockets, either on Ethernet or wireless Ethernet media; (4) address resolution protocol (ARP) support for virtual interfaces; and (5) to perform association (probe, authentication, association) for each virtual interface. In effect, the simulation system can simulate the actual activity multiple client stations would generate in associating with an access point.

Figure 7:
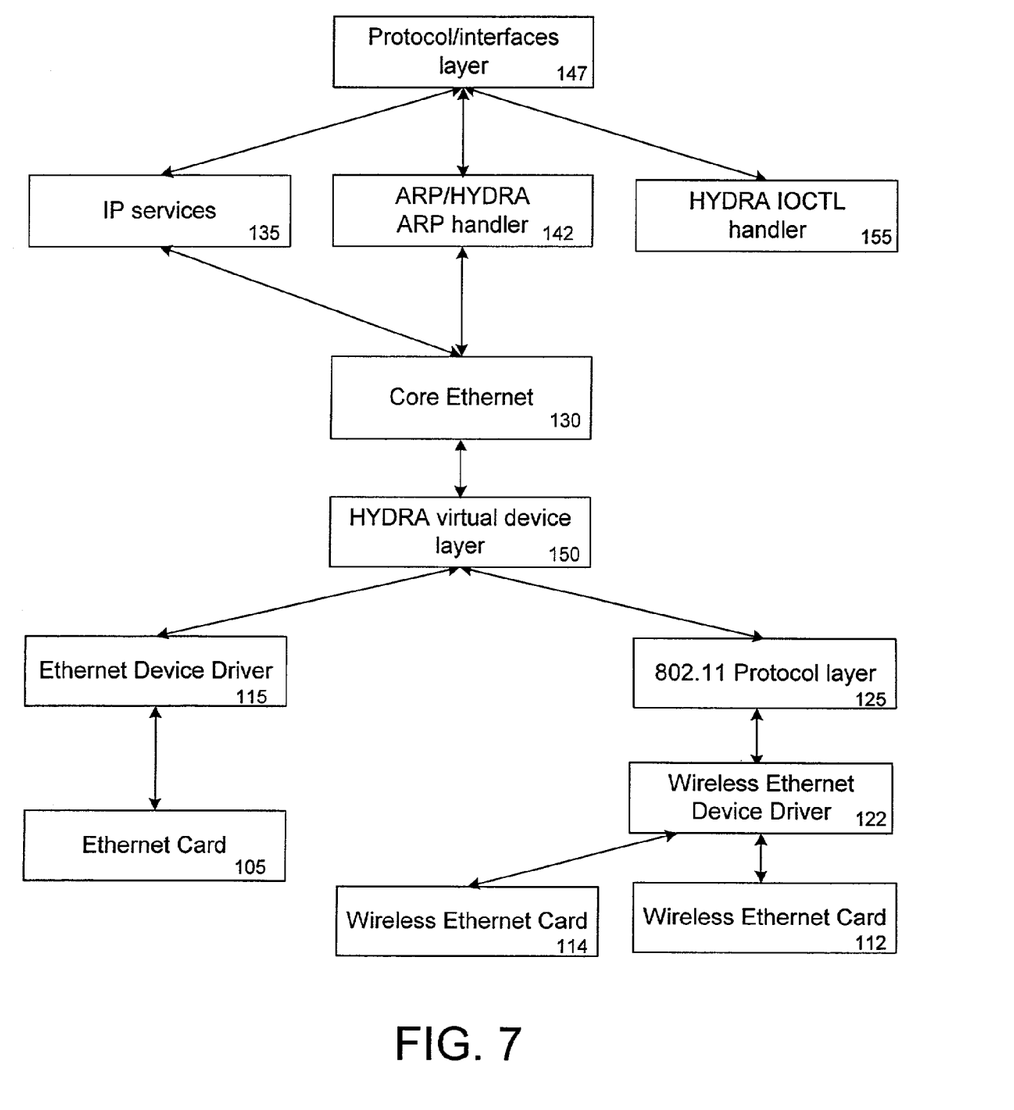
FIG. 7 illustrates the architecture of a interface simulation system according to at least one embodiment of the invention.

FIG. 7 illustrates the architecture of a simulation system according to at least one embodiment of the invention. In this architecture, wireline Ethernet communications are handled by an Ethernet card 105. The software driving the Ethernet card 105 includes Ethernet device driver 115. Wireless Ethernet communications are handled by a first Wireless Ethernet card 112 and a second Wireless Ethernet card 114. Wireless Ethernet cards 112 and 114 could be an implementation of any 802.11-based chipset such as 802.11b chipset or even 802.11a since 802.11a and 802.11b use the same MAC (media access control) layer. Wireless Ethernet cards 112 and 114 are driven by device driver 122, but may be driven by their own independent device drivers if the cards 112 and 114 are substantially different enough such that separate drivers would be required. The Ethernet device driver 115 communicates directly with a virtual device layer 150, while the device driver 122 communicates with the virtual device layer 150 via an 802.11 Protocol layer 125. Protocol layer 125 does the conversion of 802.11b packets to Ethernet and vice versa as discussed in greater detail below. Ethernet card 105 and wireless Ethernet cards 112 and 114 are installed in some host device such as a computer which runs on a operating system platform such as Linux or Windows.

The virtual device layer 150 communicates with core Ethernet circuitry 130. The core Ethernet circuitry 130 in turn communicates with IP services 135 which perform routing, IP packet building, and interfacing to upper layer protocols such as TCP/UDP found in protocol/interfaces layer 147. Core Ethernet circuitry 130 also communicates with a combined ARP and simulation ARP ("ARP/SIM ARP") handler 142 which replies to the ARP request for virtual interfaces to perform conversions between IP addresses and physical machine addresses within a computer network. The IP services 135 and ARP/SIM ARP handler 142 in turn communicate with protocol/interfaces layer 147 to provide high-level functionality to communication routines and end-user applications. Protocol/interfaces layer 147 includes TCP/UDP, application interfaces, as well as special routines called "hydracfg", which handles configuration of virtual interfaces and "wlanctl", which handles association of virtual interfaces. Protocol/interfaces layer 47 also communicates with a HYDRA IOCTL handler 155 which adds and deletes virtual interfaces.

Ethernet card 105 is configured to work in a "Promiscuous" mode, where every data packet transmitted can be received and read by the Ethernet card 105. Promiscuous mode must be supported by any Ethernet card (such as Ethernet card 105) in the simulation system as well as be supported by the input/output driver in the host operating system. Promiscuous mode allows Ethernet card 105 to receive all packets present in the transmission media. In "Non-Promiscuous" mode, only the packets to the physical (Ethernet) card address (i.e. the MAC address) are received while other packets are filtered out. In Non-Promiscuous mode, the device driver will not be able to forward such filtered-out packets to the virtual interfaces (through virtual device layer 150). In Promiscuous mode, filtering of packets is performed in the virtual device layer 150. This occurs because of the following behavior: whenever a packet is received, if it is unicast, then it is delivered to the respective virtual interface. However, if it is broadcast, it is delivered to the base device, which will in turn distribute it to all the virtual interfaces in broadcast fashion, or else the packets would be dropped.

According to 802.11 standards, a wireless client needs to do authentication and association with the access point (AP) before it can send or receive data. There are three types of frames defined in the standard, namely, control, data and management. Each frame type has several defined subtypes. Generally, the control and management frames are handled by the firmware of the card because these frames are time critical in nature. The association sequence is also handled by the card firmware. However, in implementing various embodiments of the invention, the association for each virtual device can be handled from the device driver level.

For Wireless Ethernet virtual interfaces to function properly, there must be two physical Wireless Ethernet cards or interfaces such as cards 112 and 114 shown in FIG. 7. One of the two Wireless Ethernet cards should be in Promiscuous mode, while the other of the two Wireless Ethernet cards should be in a special mode referred to herein as "Simulated AP" mode. Simulated AP mode means that the card will be able to generate and send 802.11 management and data frames by using the device driver that drives the card. Thus, if Wireless Ethernet card 112 is set in Promiscuous mode, the other card, namely, Wireless Ethernet card 114, should be set in Simulated AP mode. For the purposes of explanation assume that Wireless Ethernet card 112 is set in Promiscuous mode and that Wireless Ethernet card 114 is set in Simulated AP mode. All frame transmission in this case would be handled by Wireless Ethernet card 114. Wireless Ethernet card 112 would behave as a normal client (i.e. would be limited to sending and receiving data frames) but be set in Promiscuous mode so that it could see all such data whether destined for that card or not. In accordance with the invention, therefore, Wireless Ethernet card 112 would be used for receiving data frames which may be sent by Wireless Ethernet card 114. Filtering of frames is done at the Ethernet chipset Device driver 122 level. In this way, Wireless Ethernet card 112 would be able to act as the physical gateway for virtual interfaces, while Wireless Ethernet card 114 would perform some access point like functions, such as frame management and association and other handshaking with those virtual interfaces.

The HYDRA IOCTL handler 155 handles the IOCTLs related to the simulation system. Two IOCTLs are defined-one is used to add a virtual interface, the other is used to remove a virtual interface. The following structure of arguments is used as the parameter with the call:

```
struct hlan_ioctl_args
{
    char  dev_name[24];   /* physical card (device) name*/
    int   id;             /* virtual interface ID */
    unsigned char mac[6]; /* MAC address of the virtual interface */
    unsigned long ip;     /* IP address of the virtual interface */
    unsigned long mask;   /* netmask for virtual interface */
    unsigned long beast;  /* broadcast address */
}
```

The "SIOHYDADD" command (0x888B) adds a virtual interface. The argument "dev_name" contains the name of the physical card (either Wireless or wireline) set to Promiscuous mode, such as the device name for Wireless Ethernet card 114 (e.g. eth0, eth1. . . ). The argument "id" contains the virtual interface ID and would range from 0001 to a maximum of 9999). For example, assume that a dev_name of "eth0" would represent a physical card. Then, "eth0.0001", would be the first virtual interface spawned from card eth0, while "eth0.0002" would be the second virtual interface spawned from card eth0 and so on. The argument "mac" will have the MAC address of the of the virtual interface which is different from the MAC of the physical card. The argument mask is the "netmask" for the virtual interface, while "bcast" is the broadcast address, if any. If ip, mask and bcast are non-zero values, then the IP address of the interface is set to the given address.

Assigning an IP address for a virtual interface can be achieved in a number of ways, for instance, serially starting from the lowest in a range of available of IP addresses much dynamic allocation via DHCP. The IP address can be assigned by the application calling the SIOHYDADD command. Together with the netmask, which helps to identify the network (subnet which is group of machines) and the number of addresses in the network, a bcast (Broadcast address) can be derived. The Broadcast address is used by the host when a packet is sent to every machine in that network From the above, each virtual interface can be assigned/take on a MAC address, an IP address and a netmask as would any physical Wireless Ethernet client or wireline Ethernet client. Thus, it would appear to 802.11 management as if the virtual interface is a real physical card sending and receiving data frames.

The SIOHYDADD command performs the following functions when executed:

(1) allocate a device structure;
(2) set the name (format is dev_name.id, e.g. eth0.0001, eth0.0090 etc.);
(3) set up all the function pointers and flags in the device structure;
(4) set the MAC address if present;
(5) set the IP address if present; and
(6) register the device.

For the wireless Ethernet the following additional functions are performed:

(7) Allocate a WLAN (Wireless Local Area Network) device structure and set this to the priv structure of the actual device structure;

(8) Allocate the priv structure for the WLAN device structure; and (9) Set the state to not-associated The "SIOHYDDEL" (0x888C) command deletes a virtual interface using the same parameters as the SIOHYDADD command except that only device name and id is used in executing it. The dev_name along with id will indicate precisely which virtual interface is to be deleted. The functions performed when the SIOHYDDEL command is executed are:

(1) Get the device structure for interface;

(2) Free the priv structure part of the device structure and WLAN device structure in the case of a wireless interface; and (3) Unregister the device.

Operational Details of Virtual Device Layer 150

Since the base device (physical card) is configured to operate in Promiscuous mode, the virtual device layer 150 receives all the packets present in physical wireline Ethernet or Wireless Ethernet cards. The virtual device layer 150 decides if an incoming packet is destined for any one of the virtual devices and if so, passes that incoming packet to the core Ethernet circuitry 130. If not, an incoming packet is just dropped. Virtual device layer 150 may be embedded inside the core Ethernet circuitry 130 or may be linked to core Ethernet circuitry 130 externally.

The virtual device layer 150 is thus responsible for selecting the proper virtual interface for an incoming packet. This is achieved based upon the destination MAC address in the received packet. If the packet is broadcast, the "base device" (physical card in Promiscuous mode) is selected as the receiver. Broadcast packets should eventually reach all the interfaces, virtual and real. In accordance with the invention, broadcast packets are not directly sent to all virtual interfaces, but only to the base device which will process the broadcast packets on behalf of the virtual interfaces. For a virtual wireless interface, an additional level for 802.11 frame filtering would be performed in the device driver of the Wireless Ethernet card.

Operational Details of the 802.11 Protocol Layer 125

802.11 Protocol layer 125 is typically a feature of only Wireless virtual interfaces (i.e. virtual interfaces that spawn from a Wireless Ethernet card). 802.11 Protocol layer 125 is responsible for converting Ethernet packets (e.g., 802.3 standard) into 802.11 data packets while transmitting the packets. In the other direction, upon receiving a packet, 802.11 Protocol layer 125 constructs the Ethernet packet from the 802.11 data frame. Also, 802.11 Protocol layer 125 handles the device structure creation for a physical Wireless Ethernet card when it is first activated or enabled in the system 802.11 Protocol layer 125 also handles the 802.11 related requests from the application such as setting the SSID, channel, starting the association etc.

Referring to FIG. 6 above, the contents of address fields AD1, AD2 and AD3 of the data frame is dependent on the values of the "To DS" and "From DS" bits in the Frame Control field. TABLE I below defines the valid combinations for virtual interfaces:

TABLE I

| To DS | From DS | AD1 | AD2 | AD3 |
|---|---|---|---|---|
| 0 | 1 | Destination | BSSID | Source |
| 1 | 0 | BSSID | Source | Destination |

The BSSID in the above Table I is the Basic Service Set Identification defined in the 802.11 standards.

Operational Details of the Wireless Device Driver 122

The Wireless Device Driver 122 is the driver for wireless Ethernet card chip sets.

The HYDRA Wireless Device Driver 122 is responsible for following functions:

(1) Wireless Ethernet card chip configuration, initialization and other control interfaces;
(2) Wireless Ethernet card chip interrupt handling;
(3) Send and Receive 802.11 Management Frames;
(4) Send and Receive 802.11 Data Frames; and
(5) Filter "unwanted" packets (i.e. packets which are not to the base device, and not to the virtual device and not broadcast).

Operational Details of the ARP/SIM ARP Handler 142

The ARP/SIM ARP handler 142 is responsible for handling all the ARP requests for the virtual interfaces. ARP requests usually are broadcast requests because there is no MAC address known when the ARP request is posted in order to be able to make a unicast request and are received only by the physical card which is in Promiscuous mode. The ARP handler 142 is modified, compared to a typical ARP module, in order to handle the requests for virtual interfaces. For instance, the ARP handler 142 selects the MAC by matching the request ARP IP of the virtual interface. A device list, which may be stored in the host operating system kernel or accessible therefrom, will have a mapping of IP addresses to MAC addresses. This device list is updated based upon creation/destruction of a data structure corresponding to a virtual interface. The ARP module 142 should search for the request IP address in the device list and should respond with the Ethernet (MAC) address of the virtual interface, if found.

Two applications can be written to aid in a software or firmware based control of the simulation system, namely "hydracfg" and "wlanctl". The "hydracfg" is a application written to configure the virtual interfaces. The hydracfg application has the following usage when adding a virtual interface:

hydracfg add<intefce-name><hlan-id>[mac-addr]

where
    <intefce-name> is the name of the base device (the physical card in Promiscuous mode),
    <hlan-id> represents the nth virtual interface, and
    <mac-addr> is the MAC address for the virtual interface.

For example, "hydracfg add eth0 1" adds a new interface with name eth0.0001. The MAC address is optional. If the MAC address is not specified, then the MAC address of the base device is configured to the virtual interface. The hydracfg application has the following usage when deleting (removing) a virtual interface:

hydracfg rem<intefce-name><hlan-id> where
    <intefce-name> is the name of the base device, and
    <hlan-id> represents the nth virtual interface.

For example, "hydracfg rem eth0 1" removes the interface with name eth0.0001. The hydracfg application has the following usage when adding multiple virtual interfaces:

hydracfg mif<intefce-name><how-many><start-ip> where
    <intefce-name> is the name of the base device,
    <how-many> is the number of interfaces to add, and
    <start-ip> is the IP mask to which the first virtual interface in the series will be mapped.

For example, "hydracfg mif eth0 10 20" adds 10 virtual interfaces starting from eth0.0001 and extending to eth0.0010. In above example, interface eth0.0001 will have an IP address of a.b.c.20, eth0.0002 will have an IP address of a.b.c.21, and so on, where "a.b.c." is the reserved default IP address area for the virtual interfaces.

The application utility "wlanctl" is used in wireless interface simulation to start the association process for each virtual or real interface. The utility "wlanctl" has the following usage:

wlanctl<device-name>assoc

For example, "wlanctl eth0.0001 assoc" means start association on virtual device eth0.0001.

In another embodiment of the invention, a wireline Ethernet card (such as Ethernet card 105) may not be present in the system. In such an embodiment, however, two Wireless Ethernet cards would be present, one Wireless Ethernet card set to Promiscuous mode and the other set to Simulated AP mode. Further, though the invention has been described with reference to both Wireless and wireline Ethernet "cards", all of the embodiments of the invention can also operate with Wireless and wireline Ethernet interfaces or devices which may or may not be cards, but may be embedded devices, externally connected devices, or any other hardware, software or firmware that behaves like a Wireless or wireline Ethernet card. For instance, recently, many laptops have come equipped with built-in Ethernet interfaces which are part of the motherboard of the laptop.

Figure 8:
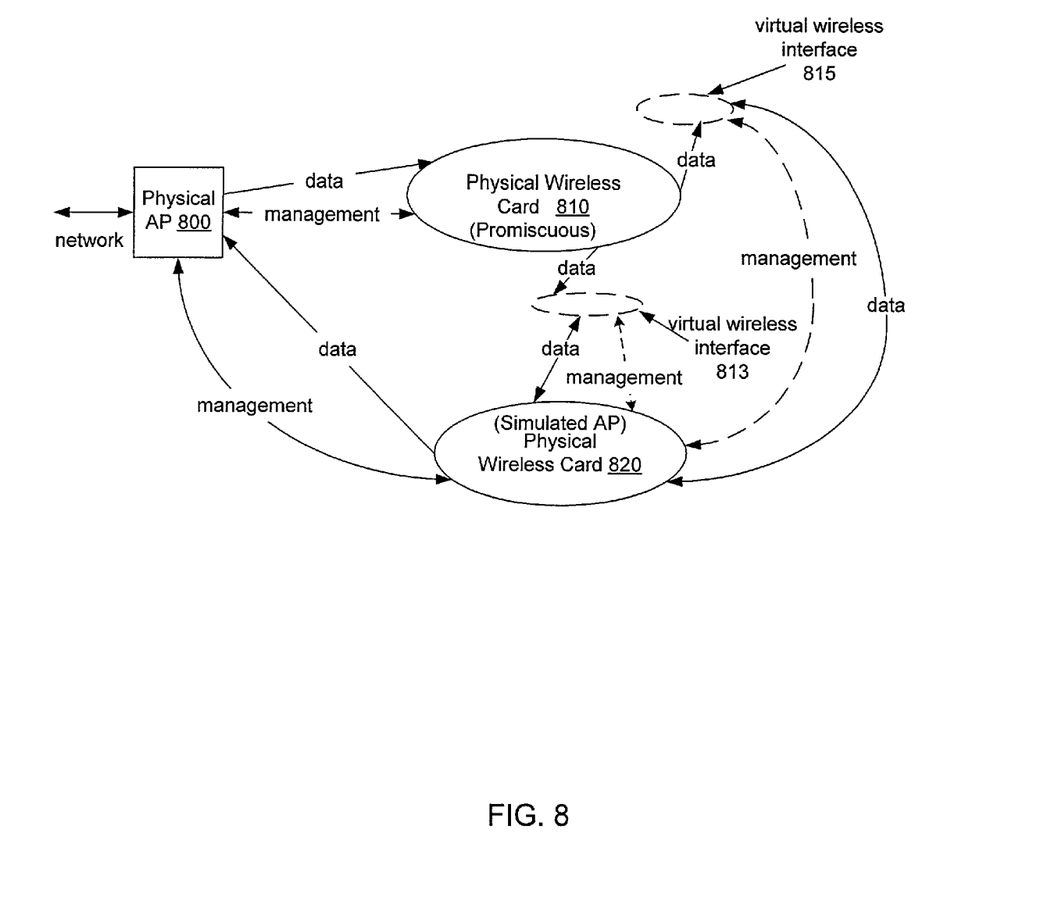
FIG. 8 illustrates exemplary interfaces resulting from implementing one or more embodiments of the invention.

FIG. 8 illustrates an exemplary interface simulation system resulting from implementing one or more embodiments of the invention. As shown, two physical wireless cards 810 and 820 are both coupled a physical access point 800. Physical wireless card 810 would be set in Promiscuous mode, while physical wireless card 820 would be set in Simulated AP mode. This configuration allows the simulation system to emulate multiple local-area wireless clients such as various laptops and PDAs connecting via wireless interfaces to an access point in an office or café. The software/firmware used to control and manage the simulated network in the illustrated example would create two virtual wireless interfaces that spawn from the same physical wireless card, namely, physical wireless card 810. Hence, virtual wireless interfaces 813 and 815 can be spawned as shown. The number of virtual wireless interfaces that may be spawned is a matter of choice and limited only by system resources or available numbers of IP addresses. Each virtual wireless interface 813 and 815 will behave similar to a physical wireless card such as physical wireless card 810 at the device level such that each behaves as would a real wireless client in terms of data transfer in relation to the physical access point 800. In addition, in Simulated AP mode, physical wireless card 820 would perform some of the management-related tasks much like physical access point 800. While Wireless card 820 may not have all of the functionality provided by a real access point, it would at least be capable of performing a software-based management functions with each virtual wireless interface 813 and 815, once created, and of sending and receiving data frames as shown. Physical wireless card 810 would receive all data frames from physical AP 800 and send/receive management frames thereto. Physical wireless card 820 would send data frames out to the physical AP 800 and send/receive management frames thereto. The physical AP 800 serves as a gateway to another network such as a WAN or the Internet. Being in Promiscuous mode allows the physical wireless card 810 to see all traffic from the Physical AP 800, and thus would be able to see (receive) data destined for virtual interfaces which have their own IP and MAC addresses different from that of the physical wireless card 810.

For instance, virtual wireless interface 815 when first added would associate itself with physical wireless card 820 and thus, would have two-way management frame communication with physical wireless card 820, which being in simulated AP mode, will perform management frame functions much like physical AP 800. Since the virtual wireless interface 815 spawned from physical wireless card 810 it would be capable of receiving data frames arriving at the physical wireless card 810 that are destined for the virtual wireless interface 815. However, the virtual wireless interface 815 does not send data frames to physical AP 800 directly out from physical wireless card 810. Data frames destined for physical AP 800 are instead sent from the virtual wireless interface 815 through the intermediary of physical wireless card 820, which forwards these data frames to physical AP 800. Since physical wireless card 810 is in Promiscuous mode, it would see all data traffic in the system, and thus, virtual wireless interface 815 could receive data frames from physical wireless card 820.

Likewise, virtual wireless interface 813 when first added would associate itself with physical wireless card 820 and thus, would have two-way management frame communication with physical wireless card 820, which being in simulated AP mode, will perform management frame functions much like physical AP 800. Since the virtual wireless interface 813 spawned from physical wireless card 810 it would be capable of receiving data frames arriving at the physical wireless card 810 that are destined for the virtual wireless interface 813. However, the virtual wireless interface 813 does not send data frames to physical AP 800 directly out from physical wireless card 810. Data frames destined for physical AP 800 are instead sent from the virtual wireless interface 813 through the intermediary of physical wireless card 820, which forwards these data frames to physical AP 800. Since physical wireless card 810 is in Promiscuous mode, it would see all data traffic in the system, and thus, virtual wireless interface 813 could receive data frames from physical wireless card 820.

Each virtual wireless interface 813, and 815 would separately thereby be linked in a two-way path, such as that created by software socket with the simulated AP 825. As desired, more virtual wireless interfaces may be added or existing ones, such as 813 and 815, may be removed. Thereafter, the virtual wireless interfaces 813 and 815 and the physical AP 800 would act as a wireless network upon which testing and other applications could be performed. The wireless network used by virtual wireless interfaces 813 and 815 are aided by the intermediary physical wireless card 820 which enables them to send data frames to physical AP 800. Since virtual wireless interfaces 813 and 815 are spawned on physical wireless card 810 (in Promiscuous mode), they are capable of receiving thereby any data frames destined for them.

The embodiments described above have been presented for purposes of explanation only, and the present invention should not be construed to be so limited. Variations on the present invention will become readily apparent to those skilled in the art after reading this description, and the present invention and appended claims are intended to encompass such variations as well.

The invention claimed is:

1. A system comprising:
 a first physical Wireless Ethernet interface configured to operate in a first mode, wherein said first mode enables said first physical interface in sending and receiving Wireless Ethernet data frames;
 a second physical Wireless Ethernet interface configured to operate in a second mode, wherein said second mode enables said second physical interface in generating and sending Wireless Ethernet management frames as well as Wireless Ethernet data frames;
 a virtual interface manager, said manager coupled to said first physical interface and to said second physical interface, said manager configured to provide a plurality of virtual interfaces spawning from said first physical interface, said second physical interface capable thereby of transacting with said virtual interfaces in a manner similar to that of said first physical interface;
 wherein said virtual interface manager includes: a virtual device layer; an IOCTL handler; and a virtual ARP handler; and
 wherein said IOCTL handler is configured to add and to delete virtual interfaces.

2. A system according to claim 1 wherein said first mode is Promiscuous mode.

3. A system according to claim 1 wherein said virtual device layer is configured to determine which of said virtual interfaces incoming packets are to be routed to.

4. A system according to claim 1 wherein said virtual ARP handler is configured to process Address Resolution Protocol requests for said virtual interfaces.

5. A system according to claim 1 wherein each virtual interface is assigned a system-unique IP address and MAC address.

6. A system according to claim 1 further comprising:
 a physical access point (AP) coupled to said first and second physical interfaces, said physical AP capable of sending data frames to said first physical interface and capable of receiving data frames from said second physical interface.

7. A system according to claim 1 further comprising:
 an 802.11 Protocol layer coupled to said virtual device layer; and
 a Wireless Ethernet device driver, said Wireless Ethernet Device Driver coupling said first and second physical interfaces to said 802.11 Protocol layer.

8. A system according to claim 1 further comprising:
 an 802.11 Protocol layer coupled to said virtual device layer; and
 a first Wireless Ethernet device driver, said Wireless Ethernet Device Driver coupling said first physical interface to said 802.11 Protocol layer; and
 a second Wireless Ethernet device driver, said Wireless Ethernet Device Driver coupling said second physical interface to said 802.11 Protocol layer.

9. A system according to claim 7 wherein said manager initiates said 802.11 Protocol layer to perform the task of association between said virtual interfaces and said second physical interface.

10. A system according to claim 6 wherein said second physical interface is adapted to forward data frames received from said virtual interfaces to said physical AP.

11. A system according to claim 6 wherein data frames received from said physical AP may be routed to one of said virtual interfaces by said first physical interface.

12. A system according to claim 6 wherein said physical AP is adapted to connect said virtual interfaces and said physical interfaces to a wide area network.

13. A system according to claim 12 wherein said wide area network is the Internet.

14. A system comprising:
a plurality of virtual Wireless networking interfaces;
a virtual interface manager, said manager coupled to said simulated wireless access point, said manager configured to provide said virtual interfaces as spawning from a first physical Wireless interface, said virtual interfaces cable of transacting data in a manner similar to that of said physical Wireless interface; wherein said first physical Wireless Ethernet interface configured to operate in a first mode, wherein said first mode enables said first physical interface in sending and receiving Wireless Ethernet data frames;
a second physical Wireless Ethernet interface configured to operate in a second mode, wherein said second mode enables said second physical interface in generating and sending Wireless Ethernet management frames as well as Wireless Ethernet data frames;
wherein said virtual interface manager includes a virtual device layer; an IOCTL handler; and a virtual ARP handler; and
wherein said IOCTL handler is configured to add and to delete virtual interfaces.

15. A system according to claim 14 wherein said first mode is Promiscuous mode.

16. A system according to claim 14 wherein said virtual device layer is configured to determine which of said virtual interfaces incoming packets are to be routed to.

17. A system according to claim 14 wherein said virtual ARP handler is configured to process Address Resolution Protocol requests for said virtual interfaces.

18. A system according to claim 14 wherein each virtual interface is assigned a system-unique IP address and MAC address.

19. A system according to claim 14 further comprising:
a physical access point (AP) coupled to said first and second physical interfaces, said physical AP capable of sending data frames to said first physical interface and capable of receiving data frames from said second physical interface.

20. A system according to claim 14 further comprising:
an 802.11 Protocol layer coupled to said virtual device layer; and
a Wireless Ethernet device driver, said Wireless Ethernet Device Driver coupling said first and second physical interfaces to said 802.11 Protocol layer.

21. A system according to claim 14 further comprising:
an 802.11 Protocol layer coupled to said virtual device layer; and
a first Wireless Ethernet device driver, said Wireless Ethernet Device Driver coupling said first physical interface to said 802.11 Protocol layer; and
a second Wireless Ethernet device driver, said Wireless Ethernet Device Driver coupling said second physical interface to said 802.11 Protocol layer.

22. A system according to claim 20 wherein said manager initiates said 802.11 Protocol layer to perform the task of association between said virtual interfaces and said second physical interface.

23. A system according to claim 19 wherein said second physical interface is adapted to forward data frames received from said virtual interfaces to said physical AP.

24. A system according to claim 19 wherein data frames received from said physical AP may be routed to one of said virtual interfaces by said first physical interface.

25. A system according to claim 19 wherein said physical AP is adapted to connect said virtual interfaces and said physical interfaces to a wide area network.

26. A system according to claim 25 wherein said wide area network is the Internet.

27. A system comprising:
a plurality of virtual wireless interfaces, each of said virtual wireless interfaces emulating a physical wireless networking interface;
a physical access point, said physical access point establishing bidirectional communications with each of said virtual wireless interfaces as if said virtual wireless interfaces were physical;
a virtual interface manager, said manager coupled to said simulated wireless access point, said manager configured to provide said virtual interfaces as spawning from a first physical Wireless interface, said virtual interfaces cable of transacting data in a manner similar to that of said physical Wireless interface; wherein said first physical Wireless Ethernet interface configured to operate in a first mode, wherein said first mode enables said first physical interface in sending and receiving Wireless Ethernet data frames;
a second physical Wireless Ethernet interface configured to operate in a second mode, wherein said second mode enables said second physical interface in generating and sending Wireless Ethernet management frames as well as Wireless Ethernet data frames;
wherein said first mode is Promiscuous mode;
wherein said virtual interface manager includes: a virtual device layer; an IOCTL
handler; and a virtual ARP handler; and
wherein said IOCTL handler is configured to add and to delete virtual interfaces.

28. A system according to claim 27 wherein said virtual device layer is configured to determine which of said virtual interfaces incoming packets are to be routed to.

29. A system according to claim 27 wherein said virtual ARP handler is configured to process Address Resolution Protocol requests for said virtual interfaces.

30. A system according to claim 27 wherein each virtual interface is assigned a system-unique IP address and MAC address.

31. A system according to claim 27 wherein said physical access point (AP) coupled to said first and second physical interfaces, further wherein said physical AP is capable of sending data frames to said first physical interface and capable of receiving data frames from said second physical interface.

32. A system according to claim 27 further comprising:
an 802.11 Protocol layer coupled to said virtual device layer; and a Wireless Ethernet device driver, said Wireless Ethernet Device Driver coupling said first and second physical interfaces to said 802.11 Protocol layer.

33. A system according to claim 27 further comprising:
an 802.11 Protocol layer coupled to said virtual device layer; and
a first Wireless Ethernet device driver, said Wireless Ethernet Device Driver coupling said first physical interface to said 802.11 Protocol layer; and
a second Wireless Ethernet device driver, said Wireless Ethernet Device Driver coupling said second physical interface to said 802.11 Protocol layer.

34. A system according to claim 32 wherein said manager initiates said 802.11 Protocol layer to perform the task of association between said virtual interfaces and said second physical interface.

35. A system according to claim 31 wherein said second physical interface is adapted to forward data frames received from said virtual interfaces to said physical AP.

36. A system according to claim 31 wherein data frames received from said physical AP may be routed to one of said virtual interfaces by said first physical interface.

37. A system according to claim 31 wherein said physical AP is adapted to connect said virtual interfaces and said physical interfaces to a wide area network.

38. A system according to claim 37 wherein said wide area network is the Internet.

* * * * *